United States Patent
Bourke et al.

(10) Patent No.: US 8,799,771 B2
(45) Date of Patent: *Aug. 5, 2014

(54) SYSTEMS AND METHODS FOR HOSTED APPLICATIONS

(71) Applicant: SweetLabs, Inc., San Diego, CA (US)

(72) Inventors: Adrian Bourke, San Diego, CA (US); Pawel Miskiewicz, Victoria (CA); Benjamin P. Morris, Vancouver (CA); Stefano Bertacchi, San Diego, CA (US); Corey Gwin, San Diego, CA (US)

(73) Assignee: Sweetlabs, San Diego, CA (US)

(\*) Notice: Subject to any disclaimer, the term of this patent is extended or adjusted under 35 U.S.C. 154(b) by 0 days.

This patent is subject to a terminal disclaimer.

(21) Appl. No.: 13/973,654

(22) Filed: Aug. 22, 2013

(65) Prior Publication Data

US 2014/0068420 A1 Mar. 6, 2014

Related U.S. Application Data

(63) Continuation of application No. 13/843,549, filed on Mar. 15, 2013.

(60) Provisional application No. 61/694,166, filed on Aug. 28, 2012.

(51) Int. Cl.
 *G06F 17/00* (2006.01)
(52) U.S. Cl.
 USPC ........................................................ 715/235
(58) Field of Classification Search
 USPC .......... 715/234, 235, 236, 237, 240, 241, 242
 See application file for complete search history.

(56) References Cited

U.S. PATENT DOCUMENTS

| | | | |
|---|---|---|---|
| 5,916,310 A | 6/1999 | McCain | |
| 6,018,343 A | 1/2000 | Wang et al. | |
| 6,094,671 A * | 7/2000 | Chase et al. | 709/201 |
| 6,216,141 B1 | 4/2001 | Straub et al. | |
| 6,327,628 B1 | 12/2001 | Anuff et al. | |

(Continued)

FOREIGN PATENT DOCUMENTS

| | | |
|---|---|---|
| CN | 1322325 A | 11/2001 |
| WO | 2006120280 A1 | 11/2006 |
| WO | 2011160139 A1 | 12/2011 |
| WO | 2013074713 A1 | 5/2013 |

OTHER PUBLICATIONS

International Search Report and Written Opinion for International Application No. PCT/US2012/65136, International Filing Date Nov. 14, 2012, Search Completed Jan. 29, 2013, Mailed Feb. 8, 2013, 7 pgs.

(Continued)

*Primary Examiner* — Laurie Ries
(74) *Attorney, Agent, or Firm* — KPPB LLP

(57) ABSTRACT

Systems and methods for locally managing a user's interaction with content derived from web pages within the user interface of an application executing within a runtime provided by an application platform on a computing device in accordance with embodiments of the invention are disclosed. In many embodiments, a runtime provided by an application platform enables the execution of a non-natively implemented hosted application in which executing instructions in a scripting language within a background page control the downloading and modification of web content to create user interface pages for the hosted application.

30 Claims, 4 Drawing Sheets

(56) References Cited

U.S. PATENT DOCUMENTS

| | | |
|---|---|---|
| 6,456,307 B1 | 9/2002 | Bates et al. |
| 6,697,838 B1 | 2/2004 | Jakobson |
| 6,718,516 B1* | 4/2004 | Claussen et al. ............. 715/234 |
| 6,810,410 B1 | 10/2004 | Durham |
| 6,909,992 B2 | 6/2005 | Ashley |
| 7,051,288 B2 | 5/2006 | Bennett et al. |
| 7,207,000 B1* | 4/2007 | Shen et al. ................... 715/207 |
| 7,272,786 B1* | 9/2007 | McCullough ................. 715/234 |
| 7,401,325 B2* | 7/2008 | Backhouse et al. ........... 717/136 |
| 7,614,018 B1 | 11/2009 | Ohazama et al. |
| 7,636,683 B1 | 12/2009 | Mills et al. |
| 7,681,134 B1 | 3/2010 | Grechishkin et al. |
| 7,734,583 B2 | 6/2010 | Vitanov et al. |
| 7,925,988 B2 | 4/2011 | Abernethy, Jr. et al. |
| 7,996,785 B2 | 8/2011 | Neil |
| 8,046,672 B2 | 10/2011 | Hegde et al. |
| 8,176,321 B1 | 5/2012 | Perry et al. |
| 8,209,598 B1 | 6/2012 | Pandey |
| 8,260,845 B1* | 9/2012 | Colton et al. ................. 709/203 |
| 8,296,643 B1 | 10/2012 | Vasilik |
| 8,296,684 B2 | 10/2012 | Duarte et al. |
| 8,335,817 B1 | 12/2012 | Dayan |
| 8,453,065 B2 | 5/2013 | Chaudhrl et al. |
| 8,458,612 B2 | 6/2013 | Chatterjee et al. |
| 8,555,155 B2* | 10/2013 | Harrison et al. ............. 715/234 |
| 8,566,697 B2* | 10/2013 | Meredith et al. ............. 715/205 |
| 2002/0109704 A1* | 8/2002 | Rajarajan et al. ............ 345/619 |
| 2004/0081310 A1 | 4/2004 | Lueckhoff |
| 2004/0221170 A1 | 11/2004 | Colvin et al. |
| 2004/0268225 A1 | 12/2004 | Walsh et al. |
| 2005/0005234 A1 | 1/2005 | Chen |
| 2005/0027704 A1* | 2/2005 | Hammond et al. ................ 707/5 |
| 2005/0102374 A1 | 5/2005 | Moragne et al. |
| 2005/0108678 A1 | 5/2005 | Goodwin et al. |
| 2005/0210412 A1 | 9/2005 | Matthews et al. |
| 2005/0273759 A1* | 12/2005 | Lucassen et al. ............. 717/105 |
| 2006/0005187 A1 | 1/2006 | Neil |
| 2006/0059422 A1 | 3/2006 | Wu et al. |
| 2006/0224989 A1 | 10/2006 | Pettiross et al. |
| 2006/0265280 A1 | 11/2006 | Nakada et al. |
| 2007/0050777 A1 | 3/2007 | Hutchinson et al. |
| 2007/0245238 A1* | 10/2007 | Fugitt et al. .................. 715/700 |
| 2007/0255814 A1 | 11/2007 | Green et al. |
| 2007/0277109 A1 | 11/2007 | Chen et al. |
| 2008/0021696 A1 | 1/2008 | Bartelt et al. |
| 2008/0040226 A1 | 2/2008 | Roker |
| 2008/0082565 A1 | 4/2008 | Chang et al. |
| 2008/0108333 A1 | 5/2008 | Jemison et al. |
| 2008/0140529 A1 | 6/2008 | Agarwal et al. |
| 2008/0154718 A1 | 6/2008 | Flake et al. |
| 2008/0172736 A1 | 7/2008 | Barr et al. |
| 2008/0208589 A1* | 8/2008 | Cross et al. .................. 704/275 |
| 2008/0256636 A1 | 10/2008 | Gassoway |
| 2009/0019371 A1 | 1/2009 | Audet |
| 2009/0019436 A1 | 1/2009 | Hartz et al. |
| 2009/0070228 A1 | 3/2009 | Ronen |
| 2009/0077174 A1 | 3/2009 | Jannssen et al. |
| 2009/0125833 A1 | 5/2009 | Abernethy, Jr. et al. |
| 2009/0171993 A1* | 7/2009 | Arthursson ................... 707/100 |
| 2009/0187928 A1 | 7/2009 | Mark |
| 2009/0216775 A1* | 8/2009 | Ratliff et al. ................... 707/10 |
| 2009/0217179 A1 | 8/2009 | Mons et al. |
| 2009/0249238 A1 | 10/2009 | Chudy et al. |
| 2009/0271394 A1 | 10/2009 | Allen et al. |
| 2009/0282333 A1* | 11/2009 | Olsen et al. .................. 715/703 |
| 2010/0023855 A1* | 1/2010 | Hedbor et al. ................ 715/234 |
| 2010/0023884 A1 | 1/2010 | Brichford et al. |
| 2010/0054128 A1 | 3/2010 | O'Hern |
| 2010/0114887 A1 | 5/2010 | Conway et al. |
| 2010/0146529 A1 | 6/2010 | Heath et al. |
| 2010/0211906 A1 | 8/2010 | Kanai |
| 2010/0228594 A1 | 9/2010 | Chweh et al. |
| 2011/0016169 A1* | 1/2011 | Cahill et al. .................. 709/203 |
| 2011/0055005 A1 | 3/2011 | Lang |
| 2011/0093900 A1 | 4/2011 | Patel et al. |
| 2011/0138295 A1 | 6/2011 | Momchilov et al. |
| 2011/0138314 A1 | 6/2011 | Mir et al. |
| 2011/0153806 A1 | 6/2011 | Bagasra |
| 2011/0289422 A1 | 11/2011 | Spivack et al. |
| 2011/0307738 A1 | 12/2011 | Hilerio et al. |
| 2011/0307880 A1 | 12/2011 | Hilerio et al. |
| 2011/0307883 A1 | 12/2011 | Hilerio et al. |
| 2011/0307946 A1 | 12/2011 | Hilerio et al. |
| 2012/0005346 A1 | 1/2012 | Burckart et al. |
| 2012/0030617 A1 | 2/2012 | Louch |
| 2012/0047442 A1 | 2/2012 | Nicolaou et al. |
| 2012/0066583 A1* | 3/2012 | Priestley et al. .............. 715/234 |
| 2012/0066634 A1 | 3/2012 | Kim et al. |
| 2012/0084713 A1 | 4/2012 | Desai et al. |
| 2012/0096396 A1 | 4/2012 | Ording et al. |
| 2012/0150963 A1 | 6/2012 | Horowitz et al. |
| 2012/0151368 A1 | 6/2012 | Tam |
| 2012/0166956 A1 | 6/2012 | Hilerio et al. |
| 2012/0166959 A1 | 6/2012 | Hilerio et al. |
| 2012/0173312 A1 | 7/2012 | Kern |
| 2012/0174075 A1* | 7/2012 | Carteri et al. ................. 717/127 |
| 2012/0233243 A1 | 9/2012 | Ashkenazy et al. |
| 2012/0235912 A1 | 9/2012 | Laubach |
| 2012/0266186 A1 | 10/2012 | Parzygnat et al. |
| 2012/0290919 A1* | 11/2012 | Melnyk et al. ................ 715/234 |
| 2012/0296959 A1 | 11/2012 | Momchilov et al. |
| 2012/0297291 A1* | 11/2012 | Fainberg et al. ............. 715/234 |
| 2012/0297377 A1 | 11/2012 | Chen et al. |
| 2012/0324338 A1 | 12/2012 | Meredith et al. |
| 2013/0024763 A1* | 1/2013 | Nemati et al. ................ 715/234 |
| 2013/0073401 A1* | 3/2013 | Cook ......................... 705/14.73 |
| 2013/0124211 A1 | 5/2013 | McDonough |
| 2013/0124557 A1 | 5/2013 | Goode et al. |
| 2013/0145348 A1 | 6/2013 | Agovic et al. |
| 2013/0173319 A1 | 7/2013 | Thomas et al. |
| 2013/0246906 A1* | 9/2013 | Hamon ......................... 715/234 |
| 2013/0268837 A1 | 10/2013 | Braithwaite |
| 2013/0304581 A1* | 11/2013 | Soroca et al. .............. 705/14.64 |

OTHER PUBLICATIONS

International Search Report and Written Opinion for International Application No. PCT/US2009/36069, date completed Jun. 23, 2009, date mailed Jul. 7, 2009, 8 pgs.

International Search Report and Written Opinion for International Application PCT/US2011/041129, Report completed Sep. 22, 2011; 15 pgs.

Laufer, "A Hike through Post-EJB J2EE Web Application Architecture", IEEE, 2005, pp. 80-88.

Lee et al., "Integrating Service Composition Flow with User Interactions", IEEE, 2008, 103-108.

Mikkonen et al., "Towards a Uniform Web Application Platform for Desktop Computers and Mobile Devices", ACM, 2008, pp. 1-29.

Stearn, "XULRunner: A New Approach for Developing Rich Internet Applications", IEEE, 2007, pp. 67-73.

Sugawara et al., "A Novel Intuitive GUI Method for User-friendly Operation", Google 2009, pp. 235-246.

"How to Use the Remote Shutdown Tool to Shut Down and Restart a computer in Windows 2000," published Jul. 5, 2006, pp. 1-2, printed from http://support.microsoft.com/kb/317371.

International Search Report and Written Opinion for International Application No. PCT/US2013/057087, mailed Mar. 19, 2014, 10 pgs.

Hei no. et al., "Developing Semantic Web Applications with the OntoWiki Framework," Springer 2009, pp. 61-77.

Oren, "SemperWiki: a Semantic Personal Wiki," Google 2005, pp. 1-16.

* cited by examiner

SYSTEMS AND METHODS FOR HOSTED APPLICATIONS

CROSS REFERENCE TO RELATED APPLICATIONS

This application is a continuation of U.S. application Ser. No. 13/843,549 filed Mar. 15, 2013, which claimed priority to U.S. Provisional Patent Application Ser. No. 61/694,166, filed Aug. 28, 2012, the disclosure of which is herein incorporated by reference in its entirety.

FIELD OF THE INVENTION

The present invention is generally related to applications and more specifically to applications that manage a user's interaction with web pages.

BACKGROUND

A runtime environment can enable an application to be integrated into the computing environment of a computing device. Typically, a runtime environment is provided for applications to be implemented natively (i.e. compiled into the machine code of the computing device on which it resides). However, other runtime environments can be provided for applications to be implemented non-natively on a computing device, such as web applications which can operate within a virtual machine provided by a web browser that operates natively on a computing device.

A web browser is an application that typically retrieves and presents information found on web pages maintained by content servers over a network. A web page is typically a file formatted in browser supported formats such as but not limited to markup languages (such as but not limited to HTML), scripts (such as but not limited to JavaScript) and style sheets (such as but not limited to CSS) that can be displayed by a web browser.

SUMMARY OF THE INVENTION

Systems and methods in accordance with embodiments of the invention download and modify web content to create interactive cross-platform applications.

One embodiment of the invention includes:

a processor and storage, where an operating system is installed on the computing device that configures the processor to create a computing environment;

an application platform application stored in the storage of the computing device, where the application platform application comprises:

a rendering engine process configured to:

render pages within the computing environment created by the operating system by interpreting instructions written in a rendering language; and implement a virtual machine configured to execute instructions written in a scripting language; and an integration process that enables instructions executing within the virtual machine to modify the computing environment;

at least one hosted application comprising:

a background page file including instructions in the scripting language:

wherein the virtual machine is configured to parse the instructions in the scripting language contained within the background page file to configure the processor to:

download at least one remotely hosted file containing instructions in the rendering language for rendering a web page;

modify the instructions written in the scripting language within the at least one downloaded file in accordance with a predetermined page modification rule to create at least one modified file;

build a document object model (DOM) based upon at least the instructions in the at least one modified file; and modify the DOM in accordance with a predetermined DOM modification rule to create a modified DOM; and wherein the rendering engine process is configured to render a user interface page based upon the modified DOM generated by the execution of the background page.

In a further embodiment, the background page is stored in the storage.

In another embodiment, a resource locator indicating the location of the background page is stored in the storage and the application platform application is configured to download the background page using the resource locator.

In a still further embodiment, modifying the instructions written in the scripting language within the at least one downloaded file in accordance with a predetermined page modification rule to create at least one modified file comprises inserting instructions into the instructions written in the scripting language within the at least one downloaded file.

In still another embodiment, the instructions inserted in the scripting language call an API in the integration layer process.

In a yet further embodiment, the instructions inserted in the scripting language call an API in a remote server.

In yet another embodiment, modifying the instructions written in the scripting language within the at least one downloaded file in accordance with a predetermined page modification rule to create at least one modified file comprises removing instructions from the instructions in the scripting language within the at least one downloaded file.

In a further embodiment again, the at least one downloaded file further comprises instructions written in the rendering language; and the method further includes: modifying instructions written in the rendering language within the at least one downloaded file in accordance with a predetermined page modification rule as part of the process of creating the at least one modified file.

In another embodiment again, modifying instructions written in the rendering language within the at least one downloaded file in accordance with a predetermined page modification rule further comprises inserting into the instructions written in the rendering language within the at least one downloaded file.

In a further additional embodiment, modifying instructions written in the rendering language within the at least one downloaded file in accordance with a predetermined page modification rule further comprises removing instructions written in the rendering language from the instructions written in the rendering language within the at least one downloaded file.

In a still yet further embodiment, the at least one downloaded file further comprises a Cascading Style Sheet (CSS); and the method further includes modifying the Cascading Style Sheet (CSS) within the at least one downloaded file in accordance with a predetermined page modification rule as part of the process of creating the at least one modified file.

In still yet another embodiment, modifying the CSS within the at least one downloaded file in accordance with a predetermined page modification rule further comprises removing a CSS from the at least one downloaded file.

In a still further embodiment again, modifying the CSS within the at least one downloaded file in accordance with a predetermined page modification rule further comprises inserting a CSS into the at least one downloaded file.

In still another embodiment again, the DOM in accordance with a predetermined DOM modification rule further comprises inserting a DOM node in the DOM.

In a still further additional embodiment, modifying the DOM in accordance with a predetermined DOM modification rule further comprises removing a DOM node in the DOM.

In still another additional embodiment, the at least one downloaded file further comprises a resource locator indicating the location of a piece of content; and the method further includes removing the resource locator from the at least one downloaded file.

In a yet further embodiment again, rendering the modified DOM using the rendering engine process includes calling an API in the integration layer.

In yet another embodiment again, rendering the modified DOM using the rendering engine process includes calling an API on a remote server.

One embodiment of the method of the invention includes executing at least one hosted application comprising a background page file including instructions in the scripting language on a computing device, where the computing device comprises a processor and a storage containing: the background page; an operating system that configures the processor to create a computing environment; and an application platform application that comprises: a rendering engine process configured to: render pages within the computing environment created by the operating system by interpreting instructions written in a rendering language; and implement a virtual machine configured to execute instructions written in a scripting language; and an integration process that enables instructions executing within the virtual machine to modify the computing environment; parsing instructions in the scripting language contained within a background page file using the rendering engine process; downloading at least one remotely hosted file containing instructions in the rendering language for rendering web page using the rendering engine process based upon instructions written in the scripting language within the background page; modifying the instructions written in the scripting language within the at least one downloaded file in accordance with a predetermined page modification rule to create at least one modified file using the rendering engine process based upon instructions written in the scripting language within the background page; building a document object model (DOM) based upon at least the instructions in the at least one modified file using the rendering engine process; modifying the DOM in accordance with a predetermined DOM modification rule to create a modified DOM based upon instructions written in the scripting language within the background page; and rendering a user interface page based upon the modified DOM using the rendering engine process.

DETAILED DESCRIPTION

Figure 1:
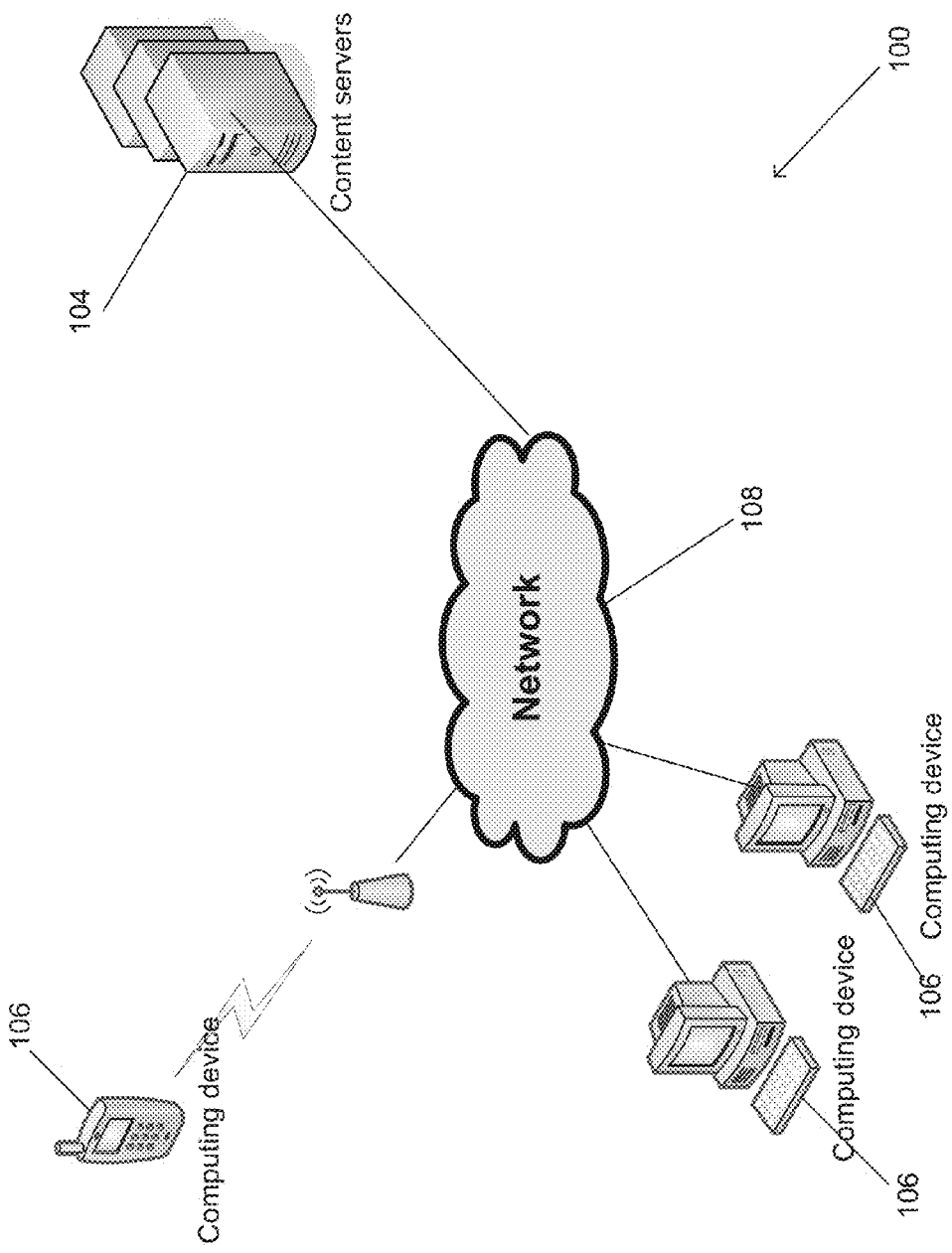
FIG. 1 is a network diagram illustrating a system that utilizes hosted applications in accordance with an embodiment of the invention.

Turning now to the drawings, systems and methods for locally managing a user's interaction with content derived from web pages within the user interface of a hosted application executing within a runtime provided by an application platform on a computing device in accordance with embodiments of the invention are illustrated. In many embodiments, a runtime provided by an application platform enables the execution of a non-natively implemented hosted application. Application platforms that create a runtime environment in which non-natively implemented hosted applications can execute are discussed in U.S. application Ser. No. 13/164,740 filed Jun. 20, 2011 titled "Systems and Methods for Integration of an Application Runtime Environment into a User Computing Environment", the disclosure of which is hereby incorporated by reference in its entirety. In several embodiments, a runtime environment generated by an application platform is at least partially natively implemented and provides an intuitive user interface that is integrated with the computing environment of a device's operating system. The application platform can enable a user to access, organize and discover applications, including hosted applications, which can execute within the runtime environment. In many embodiments, an application platform includes a rendering engine layer and an integration layer. The rendering engine layer includes various parsers and virtual machines associated with supporting specific web technologies including but not limited to HTML, JavaScript, and CSS. The integration layer exposes a number of APIs that can be called by a hosted application to make modifications to a user's computing environment. In several embodiments, the integration layer APIs are JavaScript APIs that can be called by a hosted application running within the application runtime environment created by the application platform. In response to the API calls the integration layer can communicate with the operating system and/or natively implemented processes to modify the user's computing environment.

A hosted application can be implemented using a background page which generates at least one user interface page. User interface pages are generated locally using the logic of the background page, found within the hosted application's package stored on a computing device, and derived from a web page maintained by content servers over a network such as (but not limited to) the Internet. The background page is loaded locally at the time the hosted application is initiated from the hosted application's package and is defined in the hosted application manifest. A hosted application's package can include an application manifest, located in the root directory of the hosted application's package, to bootstrap the application into an application platform (such as but not limited to an application platform application) in order to share the resources of the application platform.

In many embodiments, the background page contains all of the logic of the hosted application. The logic of the hosted application can parse one or more remotely hosted text files that constitute a web page to determine the content of the text file(s). From a determination of the content of the text file(s), the logic of the background page can generate a user interface page derived from the remotely hosted web page by including or excluding content, markup, scripts or style sheets in view of the remotely hosted web page. For example, the logic could cause exclusion of certain, text, pictures, sounds or animation, cause a change in the layout of content, preventing the loading of a pop up window, and/or changing the text font. In other embodiments, any of a variety of predetermined page modification rule can be applied that is capable of being expressed as a logical statement. The logic can include or exclude content, markup, scripts or style sheets upon first accessing the web page as one or more text files maintained on a remote server (by modifying the instructions in markup and/or scripting language(s) contained within the text file(s)) and once again after building a Document Object Model (DOM) using the text files (by modifying the nodes or the text of the DOM). Furthermore, the inclusion of content, markup, scripts or style sheets also includes the inclusion of application platform APIs, which can call for functions performed locally at the application platform or performed remotely at a remote server. The background page can be implemented using one or more text files (as opposed to a binary executable file) that can include HTML, JavaScript and/or CSSs that the rendering engine layer of the application platform parses to implement the logic contained therein in a similar fashion to the way in which the rendering engine of a web browser application parses a conventional web page when enabling a web application on a computing device. In numerous embodiments, a background page can load JavaScript as the logic that conducts page flow control and injection of styling and functionality to the content and markup, CSS and JavaScript derived from a web page to generate a user interface page. In certain embodiments, a background page is formatted in a markup language, such as HTML, located within the hosted application's package. The JavaScript of the background page can be loaded locally or from a remote server and dynamically pulled as the application is launched.

An application platform can implement a user interface for a hosted application using instructions contained within a background page to generate user interface pages with content derived from web pages hosted on remote servers. In certain embodiments, a user interface page is generated according to the logic of the background page using a URL that enables retrieval of a web page from a remote server that can be rendered by the rendering engine of the application platform to create the user interface page based upon the content found using the URL. In numerous embodiments, a user interface page is generated by adding to and/or removing portions of the content along with the markup, scripts and CSS retrieved from a web page before or as the user interface page is displayed. Certain user interface pages may not, however, require any modification in order to be rendered by the application platform. In certain embodiments, a user interface page is rendered by the application platform in response to a user selecting a link, such as a hyperlink or Uniform Resource Locator (URL). In response to the selection of a link, the hosted application can instruct the application platform to generate a user interface page using the web page identified by the link. In several embodiments, a user can interact with content derived from web pages as a controlled flow of user interface pages in an experience akin to how a user would experience content on a mobile application executing natively within an operating system such as (but not limited to) the iOS mobile operating system developed and distributed by Apple Inc. headquartered in Cupertino, Calif. or the Android mobile operating system released by Google, Inc. headquartered in Mountain View, Calif. Thereby, a hosted application manages user interaction with remotely hosted web pages by generating user interface pages from the remotely hosted web pages according to instructions contained within a background page and/or obtained using the background page that control the flow from one user interface page to another.

Although specific embodiments of hosted applications are discussed above, hosted applications can be implemented in any manner as appropriate to the requirements of a specific application in accordance with embodiments of the invention. Systems and methods incorporating application platforms configured to execute hosted applications that generate user interface pages from remotely hosted web pages in accordance with embodiments of the invention are discussed below.

System Architecture

Hosted applications running on computing devices in accordance with many embodiments of the invention can manage user interactions derived from a remote web page formatted in a cross-platform language (e.g. a markup and/or scripting language supported by a web browser application) into a format suitable for display as a user interface page. In certain embodiments, the computing devices on which hosted applications execute within a runtime provided by an application platform can communicate via a network with content servers that maintain text files and content utilized by rendering engines in web browser applications to render web pages. In many embodiments, the text files contain instructions in markup languages, and/or scripting languages that a web browser application interprets when formatting content for display. As the hosted application executes within the application platform, the hosted application derives user interface pages from the text files and content retrieved from the remote content servers. The user interface pages can then be rendered by a rendering engine within the application platform to provide a user interface for the hosted application.

A network diagram illustrating a system that utilizes hosted applications in accordance with an embodiment of the invention is illustrated in FIG. 1. The system 100 includes a number of computing devices 106 connected to content servers 104 via a network 108, such as but not limited to the Internet. The content servers 104 maintain websites, including web pages and content that can be accessed by hosted applications running on computing devices 106. Within each computing device, hosted applications can execute within the runtime environment provided by an application platform and can access web pages from one or more content servers to generate user interface pages.

Although specific systems that utilize hosted applications are discussed above, systems can utilize hosted applications in any manner as appropriate to the requirements of a specific application in accordance with embodiments of the invention. The lifecycle of hosted applications in accordance with embodiments of the invention are discussed further below.

Hosted Application Lifecycle

Hosted applications in accordance with many embodiments of the invention locally manage a user's interactions by locally creating a user interface page derived from remote web pages. Hosted applications are configured to generate a user interface page according to instructions in a scripting language, such as (but not limited to) JavaScript, contained within a background page and/or obtained using the background page. The instructions within the background page dictates the injection or removal of content (such as but not limited to pictures, animation, sound or text), and the HTML, JavaScript and/or CSSs found within the text files maintained on a remote server to generate a user interface page. The background page is loaded upon hosted application initialization and remains active in the background so long as the hosted application is executing. The background page includes the logic used to generate user interface pages from web pages retrieved from a remote server that maintains the web pages. Executing the instructions generates instructions from which the rendering engine layer of the application platform can render the user interface page on a computing device and the integration layer of the application platform can integrate the user interface page with the functionality of the computing device.

Thereby, a user interface page derived from a web page can present a user of the computing device with a controlled user experience, according to the logic of the background page executing from a hosted application's package locally stored on the computing device. For example, a hosted application can control the content with which a user can interact, such as by allowing or denying a user's access to content found on a particular web page (such as pop up windows or particular images found on the web page).

Figure 2:
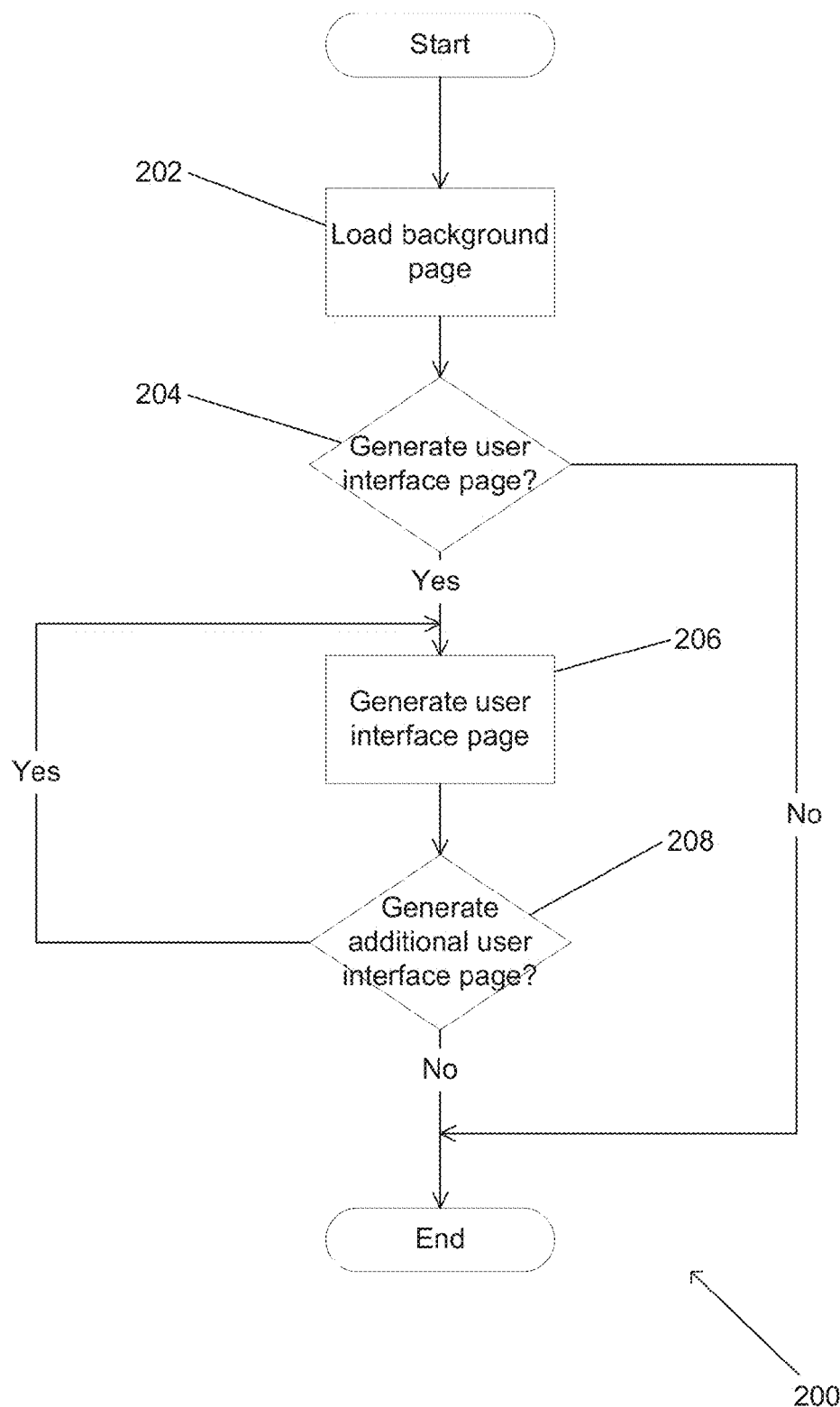
FIG. 2 is a flowchart of a lifecycle process of a hosted application in accordance with an embodiment of the invention.

In several embodiments, a hosted application's lifecycle includes the generation of various user interface pages according to the instructions contained within the background page and/or obtained using the background page. A lifecycle process of a hosted application in accordance with an embodiment of the invention is illustrated in FIG. 2. The process 200 includes loading (202) a background page. In certain embodiments, a background page is loaded upon initializing the hosted application. A background page can be loaded from a hosted application's package locally stored on a computing device. In several embodiments, the background page includes a URL that is used to load one or more text files from a remote server that include instructions implementing the logic of the hosted application. Instructions contained within a background page and/or instructions contained within files retrieved using information contained within the background page can be collectively referred to as the instructions of the background page and are part of the logic of the background page. The logic of the hosted application is used to generate user interface pages from web pages maintained by remote servers. After the background page is loaded (202), a decision (204) is made as to whether a user interface page should be generated. The decision is made according to the instructions of the background page. In certain embodiments, the instructions of the background page automatically load an initial user interface page using a URL that directs the hosted application to access one or more files on a remote website that can be rendered as a web page using a web browser application. The application platform utilizes the one or more files indicated by the URL to generate a user interface page. The URL can be loaded automatically (such as but not limited to where the logic of the background page retrieves a URL from the hosted application's package without explicit user instructions) or manually (such as but not limited to where a user provides a specific URL for the background page of the hosted application). The process continues generating (206) user interface pages as a user interacts with the hosted application until there is no further need to generate user interface pages (e.g. the user hides, closes or terminates the execution of the hosted application). The decision as to whether additional user interface pages are to be generated is made by the logic of the background page. The generation of a user interface page is discussed in more detail in FIG. 3.

Although specific lifecycles of hosted applications are discussed above, a hosted application can have any lifecycle as appropriate to the requirements of a specific application in accordance with embodiments of the invention. Generation of a user interface page of a hosted application is discussed further below.

Generation of User Interface Pages

User interface pages in accordance with embodiments of the invention can be generated from content and one or more text files containing instructions in markup and/or scripting languages capable of being rendered by a web browser application. The user interface pages are generated from the content and one or more text files according to the instructions of a background page that specifies the logic of a hosted application. A user interface page is generated by modifying the text that represents a web page by injecting and/or removing content, markup, style sheets and scripts from the retrieved web page according to the logic of the background page. Although in many embodiments a web page is remotely hosted, user interface pages may also be generated from one or more locally stored files including content, markup, scripts and/or style sheets. Upon the generation of a user interface page, an application platform can integrate the user interface page with the computing environment of the computing device and render the user interface page in the foreground of the computing environment of a computing device for user interaction. In certain embodiments, the logic of the background page can generate a user interface page in accordance with the requirements of a specific application, such as (but not limited to) ensuring that a rendered user interface page can fit within a window of the hosted application's user interface.

The logic of the hosted application can parse the text file of a remotely hosted web page to generate a user interface page with particular content, markup, scripts or style sheets. The inclusion of particular content, markup, scripts or style sheets also covers the inclusion of API calls including (but not limited to) API calls to the application platform and remote servers. A user interface page that includes particular content, markup, scripts and/or style sheets can be generated by modifying the accessed web page first as a retrieved text file and/or second after building the DOM of the modified retrieved text file. The first modification of the accessed web page as a retrieved text file includes parsing the code of the retrieved text file to determine the content of the retrieved text file to determine the content, markup, scripts and/or style sheets to include or exclude from a user interface page. Further modifications can occur after a DOM is built. In several embodiments, text or nodes are modified by including or excluding particular content, markup, scripts or style sheets as nodes of a completed DOM.

Figure 3:
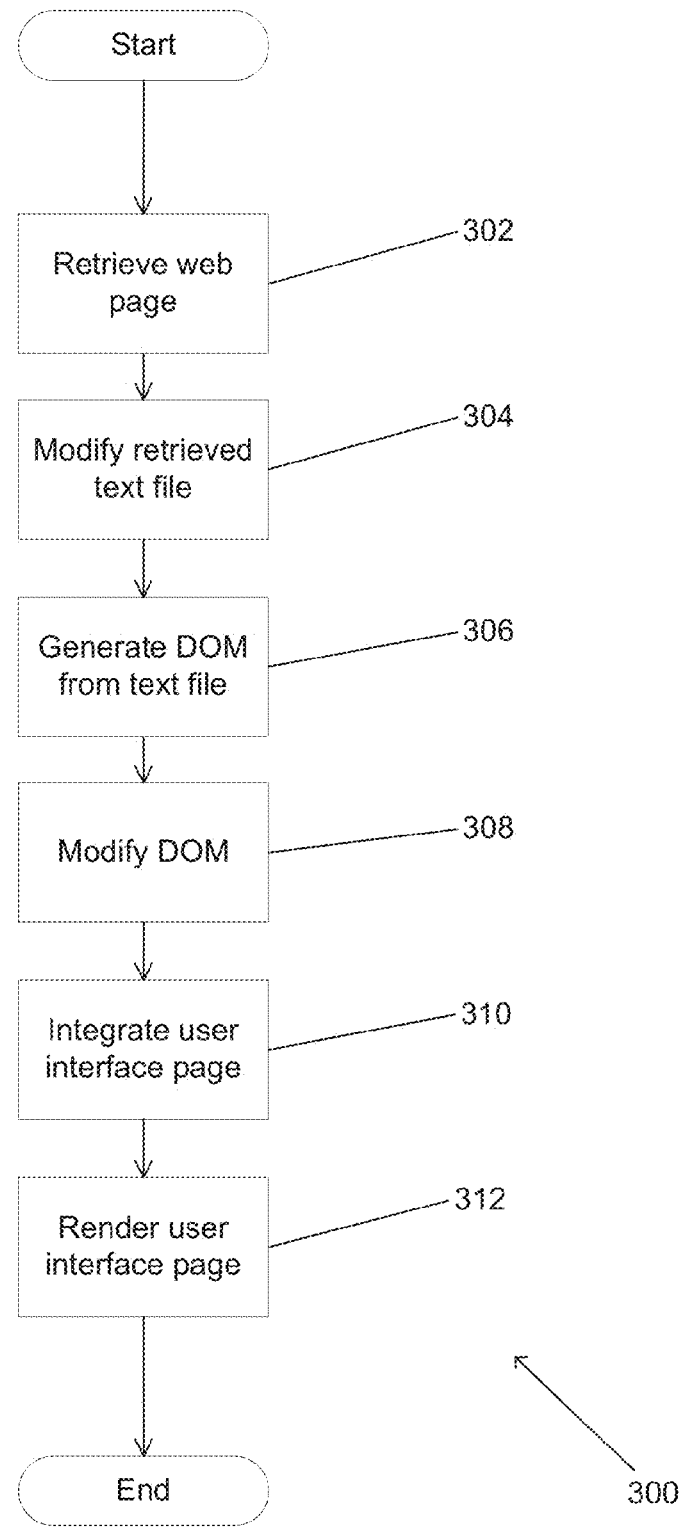
FIG. 3 is a flowchart of a process for rendering a user interface page in accordance with an embodiment of the invention.

A process for generating a user interface page in accordance with an embodiment of the invention is illustrated in FIG. 3. The process 300 includes retrieving (302) a web page. In many embodiments, a hosted application is provided (manually or automatically) with a URL from which one or more files associated with a web page can be retrieved (302). As noted above, the retrieved text files can include content with markup, scripts, and style sheets from which a typical web browser can render the web page. After retrieving (302) the text file, instructions within the background page determine the modifications (304) applied to the text file by modifying by injecting and/or removing content, markup, scripts and/or style sheets. After modifying (304) the text file, a DOM representation of the text file is generated (306). Upon generating (306) the DOM, the DOM is modified (308) by injecting and/or removing content, markup, scripts and/or style sheets within the DOM. The application platform utilizes its integration and rendering engine layers to integrate (310) and render (312) the user application page.

In certain embodiments, the application platform can either remove or replace the code of a remote web page as particular nodes of a remote web page in a DOM, according to the logic of the background page. In certain embodiments, a node including window functions, such as "window.open", can be detected and fed into the logic of the background page. Thereby, the logic of the background page can make a decision as to how the window functions that imply modifications outside of the rendered user interface page (e.g. resizeTo/resizeBy) should influence the chrome that contains the rendered user interface page. The logic of the background page can replace the "window.open" code of opening a browser window by replacing it with a script for generating a user interface page using the details provided by the "window.open" code, such as (but not limited to) the URL of the web page to access while ignoring the other specifications such as a web browser window name, access to a menu bar, ability to resize the web browser window, and implementation of particular scrollbars, status bars and tool bars. Similarly, the logic can parse the text of a web page to determine if "window.resizeTo" or "window.resizeBy" or "window.close" code is present and remove or replace the code according to the logic of the background page.

In a variety of embodiments, the logic can incorporate custom style sheets (such as by adding style sheets when generating a user interface page's "head" node). In certain embodiments, incorporation of style sheets to a user interface page's "head" node is performed by the execution of the following code:

```
var style = document.createElement('STYLE');
style.type = 'text/css';
document.getElementsByTagName('HEAD')[0].appendChild(
style);
```

In numerous embodiments, the logic of the background page can incorporate functionality by integrating scripts or calls for application platform APIs (such as but not limited to an API that enables resizing of a user interface page, for example to a default window size of 640×480 pixels). In particular embodiments, scripts can be incorporated to a user interface page's "head" node where the incorporation of scripts to a user interface page's "head" node is performed by the execution of the following instructions:

```
var script = document.createElement('SCRIPT');
script.type = 'text/javascript';
document.getElementsByTagName('HEAD')[0].appendChild(script);
```

In a number of embodiments, the logic of the background page controls user interaction with the hosted application by disabling or adding functions traditionally present in a web browser. In certain embodiments, disabling or adding functions is accomplished by adding or removing various scripts or API calls that enable functionalities including (but are not limited to) the ability to cut, copy, paste, select all text, utilize a spell checker, resize a rendered web page or the ability to manually determine the flow of web pages (such as enabling a user to view web pages previously accessed, e.g. back and/or forward commands) rendered by a web browser.

In many embodiments, the logic of the background page can generate a user interface page at any time after accessing the remote web page from which the user interface page is generated, including prior to or after the DOM of the web page is loaded.

In several embodiments, the logic of the background page can monitor the access of a web page (such as the download of one or more text files used to render a web page) during the generation of a user interface page and display a splash page while the user interface page is being generated. In certain embodiments, the download of one or more text files used to render a web page is reported back to the background page through the following function where the body of the function returns an indication of progress as an integer between 0 and 100:

```
function onPageLoadProgress(pageName, progress) {
}
```

In particular embodiments, the detection of an error in the download of one or more text files used to render a web page causes the background page to load a user interface page based upon an error detected through the following function where the body of the function causes a particular user interface page to be displayed based upon a particular error:

```
function onPageLoadingError(url, pageName, errorCode) {
}
```

Although specific processes for generating a user interface page are discussed above, user interface pages may be generated according to any of a variety of process as appropriate to the requirements of a specific application in accordance with embodiments of the invention. Rendering of user interface pages of a hosted application is discussed further below.

Rendering User Interface Pages

Figure 4:
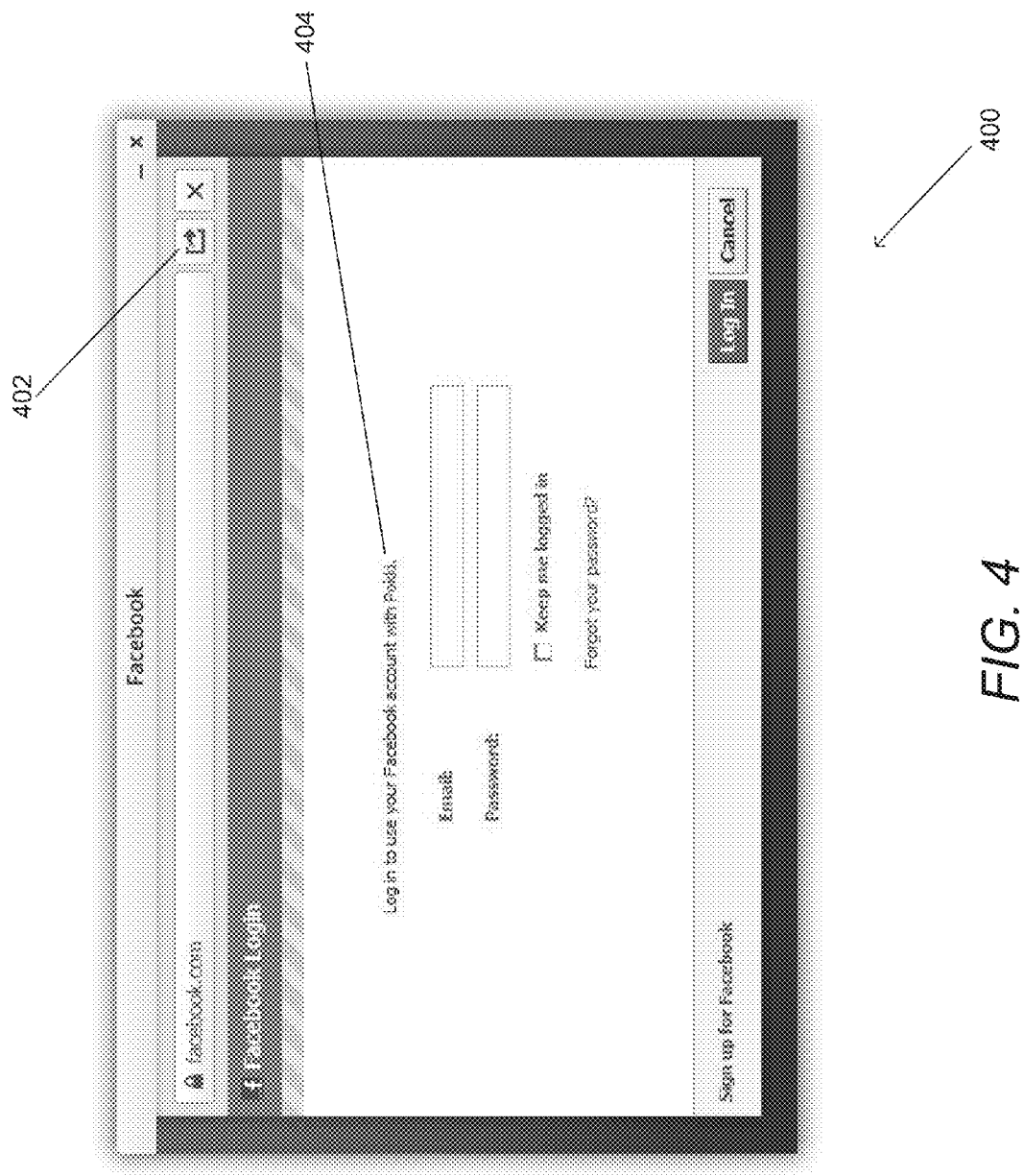
FIG. 4 is a screenshot of a user interface of a hosted application displaying a user interface page in accordance with an embodiment of the invention.

A user interface page of a hosted application in accordance with many embodiments of the invention can be rendered within the user interface of the computing device on which the hosted application is executing. A rendered user interface page in accordance with an embodiment of the invention is illustrated in FIG. 4. The user interface page 400 enables a user to log into a user account associated with the Facebook social networking service maintained by Facebook, Inc. headquartered in Menlo Park, Calif. Additional styling and functionality was injected into the user interface page (that was not present in the web page that the user interface page is derived from) such as a button 402 for launching the web page in a traditional web browser as well as a link 404 integrating additional functionality which was not present in the web page from which the user interface page is derived.

Although specific user interface pages of a hosted application are discussed above, any user interface page can be rendered as appropriate to a specific application in embodiments of the invention.

While the above description contains many specific embodiments of the invention, these should not be construed as limitations on the scope of the invention, but rather as an example of one embodiment thereof. It is therefore to be understood that the present invention may be practiced otherwise than specifically described, without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A computing device configured to execute a hosted application, comprising:

a processor and storage, where an operating system is installed on the computing device that configures the processor to create a computing environment;

an application platform application stored in the storage of the computing device, where the application platform application comprises:
  a rendering engine process configured to:
    render pages within the computing environment created by the operating system by interpreting instructions written in a rendering language; and
    implement a virtual machine configured to execute instructions written in a scripting language; and
  an integration process that enables instructions executing within the virtual machine to modify the computing environment;
at least one hosted application comprising a background page file including instructions in the scripting language:
wherein the virtual machine is configured to parse the instructions in the scripting language contained within the background page file to configure the processor to:
  download at least one remotely hosted file containing instructions in the rendering language for rendering a web page;
  build a document object model (DOM) based on at least the instructions in the at least one modified file; and
  modify the DOM in accordance with a predetermined DOM modification rule to create a modified DOM; and
wherein the rendering engine process is configured to render a user interface page based on the DOM generated by the execution of the background page.

2. The computing device of claim 1, wherein the background page is stored in the storage.

3. The computing device of claim 1, wherein a resource locator indicating the location of the background page is stored in the storage and the application platform application is configured to download the background page using the resource locator.

4. The computing device of claim 1, wherein modifying the instructions written in the scripting language within the at least one downloaded file in accordance with a predetermined page modification rule to create at least one modified file comprises inserting instructions into the instructions written in the scripting language within the at least one downloaded file.

5. The computing device of claim 4, wherein the instructions inserted in the scripting language call an API in the integration layer process.

6. The computing device of claim 4, wherein the instructions inserted in the scripting language call an API in a remote server.

7. The computing device of claim 1, wherein modifying the instructions written in the scripting language within the at least one downloaded file in accordance with a predetermined page modification rule to create at least one modified file comprises removing instructions from the instructions in the scripting language within the at least one downloaded file.

8. The computing device of claim 1, wherein:
the at least one downloaded file further comprises instructions written in the rendering language; and the method further comprises:
modifying instructions written in the rendering language within the at least one downloaded file in accordance with a predetermined page modification rule as part of the process of creating the at least one modified file.

9. The computing device of claim 8, wherein modifying instructions written in the rendering language within the at least one downloaded file in accordance with a predetermined page modification rule further comprises inserting into the instructions written in the rendering language within the at least one downloaded file.

10. The computing device of claim 8, wherein modifying instructions written in the rendering language within the at least one downloaded file in accordance with a predetermined page modification rule further comprises removing instructions written in the rendering language from the instructions written in the rendering language within the at least one downloaded file.

11. The computing device of claim 1, wherein:
the at least one downloaded file further comprises a Cascading Style Sheet (CSS); and the method further comprises:
modifying the Cascading Style Sheet (CSS) within the at least one downloaded file in accordance with a predetermined page modification rule as part of the process of creating the at least one modified file.

12. The computing device of claim 11, wherein modifying the CSS within the at least one downloaded file in accordance with a predetermined page modification rule further comprises removing a CSS from the at least one downloaded file.

13. The computing device of claim 11, wherein modifying the CSS within the at least one downloaded file in accordance with a predetermined page modification rule further comprises inserting a CSS into the at least one downloaded file.

14. The computing device of claim 1, wherein parsing the instructions in the scripting language contained within the background page file further comprises modifying the instructions written in the scripting language within the at least one downloaded file in accordance with a predetermined page modification rule to create at least one modified file.

15. The computing device of claim 1, wherein modifying the DOM in accordance with a predetermined DOM modification rule further comprises inserting a DOM node in the DOM.

16. The computing device of claim 1, wherein modifying the DOM in accordance with a predetermined DOM modification rule further comprises removing a DOM node in the DOM.

17. The computing device of claim 16, wherein the removed DOM node in the DOM corresponds to an iFrame tag in the at least one downloaded file.

18. The computing device of claim 1, wherein rendering the DOM using the rendering engine process includes calling an API in the integration layer.

19. The computing device of claim 1, wherein rendering the DOM using the rendering engine process includes calling an API on a remote server.

20. The computing device of claim 1, wherein:
the at least one downloaded file further comprises a resource locator indicating the location of a piece of content; and the method further comprises:
removing the resource locator from the at least one downloaded file.

21. The computing device of claim 1, wherein the downloaded file further comprises an application manifest configured to bootstrap the application into the application platform application in order to share the resources of the application platform.

22. The computing device of claim 1, wherein the rendering process is configured to ensure that the rendered user interface page can fit within a window of the hosted application's user interface.

23. A method of executing a hosted application on a computing device, comprising:
   executing at least one hosted application comprising a background page file including instructions in the scripting language on a computing device, where the computing device comprises a processor and a storage containing:
      the background page;
      an operating system that configures the processor to create a computing environment; and
      an application platform application that comprises:
         a rendering engine process configured to:
            render pages within the computing environment created by the operating system by interpreting instructions written in a rendering language; and
            implement a virtual machine configured to execute instructions written in a scripting language; and
         an integration process that enables instructions executing within the virtual machine to modify the computing environment;
   parsing instructions in the scripting language contained within a background page file using the rendering engine process;
   downloading at least one remotely hosted file containing instructions in the rendering language for rendering web page using the rendering engine process based on instructions written in the scripting language within the background page;
   building a document object model (DOM) based on at least the instructions in the at least one modified file using the rendering engine process;
   modifying the DOM in accordance with a predetermined DOM modification rule to create a modified DOM based on instructions written in the scripting language within the background page using the rendering engine process; and
   rendering a user interface page based on the modified DOM using the rendering engine process.

24. The method of claim 23, further comprising downloading the background page based on a resource locator using the application platform application, where the resource indicates the location of the background page.

25. The method of claim 23, wherein modifying the instructions written in the scripting language within the at least one downloaded file in accordance with a predetermined page modification rule to create at least one modified file comprises removing instructions from the instructions in the scripting language within the at least one downloaded file using the application platform application.

26. The method of claim 23, further comprising modifying instructions written in the rendering language within the at least one downloaded file in accordance with a predetermined page modification rule as part of creating the at least one modified file using the application platform application, where the at least one downloaded file further comprises instructions written in the rendering language.

27. The method of claim 23, further comprising modifying a Cascading Style Sheet (CSS) contained within the downloaded file within the at least one downloaded file in accordance with a predetermined page modification rule as part of the process of creating the at least one modified file using the application platform application.

28. The method of claim 23, further comprising modifying the instructions written in the scripting language within the at least one downloaded file in accordance with a predetermined page modification rule to create at least one modified file using the rendering engine process based on instructions written in the scripting language within the background page.

29. The method of claim 23, further comprising removing a resource locator from the at least one downloaded file using the application platform application, where the resource locator indicates the location of a piece of content.

30. A computing device configured to execute a hosted application, comprising:
   a processor and storage, where an operating system is installed on the computing device that configures the processor to create a computing environment;
   an application platform application stored in the storage of the computing device, where the application platform application comprises:
      a rendering engine process configured to:
         render pages within the computing environment created by the operating system by interpreting instructions written in a rendering language; and
         implement a virtual machine configured to execute instructions written in a scripting language; and
      an integration process that enables instructions executing within the virtual machine to modify the computing environment;
   at least one hosted application comprising:
      a background page file including instructions in the scripting language, where a portion of the instructions in the scripting language include logic to conduct page flow control; and
      an application manifest configured to bootstrap the application into the application platform created by the application platform application;
   wherein the virtual machine is configured to parse the instructions in the scripting language contained within the background page file to configure the processor to:
      download at least one remotely hosted file containing instructions in the rendering language for rendering a web page, where the at least one downloaded file comprises instructions written in the rendering language, a Cascading Style Sheet (CSS), and a resource locator indicating the location of a piece of content;
      modify instructions written in the rendering language within the at least one downloaded file in accordance with a predetermined page modification rule, where at least one of the modified instructions includes an iFrame tag;
      modify the Cascading Style Sheet (CSS) within the at least one downloaded file in accordance with a predetermined page modification rule;
      remove the resource locator from the at least one downloaded file;
      build a document object model (DOM) based on at least the instructions in the at least one modified file; and
      modify the DOM in accordance with a predetermined DOM modification rule to create a modified DOM based on instructions written in the scripting language within the background page; and
   wherein the rendering engine process is configured to render a user interface page based on the DOM generated by the execution of the background page, where the rendering of the user interface page comprises calling an application programming interface in the integration layer.

* * * * *